(12) United States Patent
Virden et al.

(10) Patent No.: US 9,161,008 B2
(45) Date of Patent: *Oct. 13, 2015

(54) PERSONAL VIDEO RECORDING DEVICE AND METHOD FOR SAVING A PROGRAM IN A TEMPORARY RECORDING

(75) Inventors: Steven Virden, Monument, CO (US); Anton H. Kirchner, Centennial, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 61 days.

This patent is subject to a terminal disclaimer.

(21) Appl. No.: 12/843,810

(22) Filed: Jul. 26, 2010

(65) Prior Publication Data

US 2011/0019968 A1   Jan. 27, 2011

Related U.S. Application Data

(63) Continuation of application No. 11/118,463, filed on Apr. 29, 2005, now Pat. No. 7,778,520.

(60) Provisional application No. 60/566,865, filed on Apr. 29, 2004.

(51) Int. Cl.
| | |
|---|---|
| *H04N 5/76* | (2006.01) |
| *H04N 9/804* | (2006.01) |
| *H04N 5/765* | (2006.01) |
| *H04N 5/782* | (2006.01) |

(52) U.S. Cl.
CPC .............. *H04N 9/8042* (2013.01); *H04N 5/765* (2013.01); *H04N 5/782* (2013.01)

(58) Field of Classification Search
CPC .............................. H04N 5/765; H04N 9/8205

USPC .................... 386/298, 326, 291, 297, 248
See application file for complete search history.

(56) References Cited

U.S. PATENT DOCUMENTS

| | | | |
|---|---|---|---|
| 5,774,186 A | 6/1998 | Brodsky et al. | |
| 6,072,645 A | 6/2000 | Sprague | |
| 6,091,456 A | 7/2000 | Schaas | |
| 6,647,479 B1 | 11/2003 | Laws | |
| 6,868,225 B1 | 3/2005 | Brown et al. | |
| 6,971,121 B2 * | 11/2005 | West et al. .................... | 725/142 |
| 7,194,563 B2 * | 3/2007 | Plourde, Jr. .................... | 710/52 |
| 7,257,308 B2 * | 8/2007 | Plourde et al. ................ | 386/230 |
| 7,260,312 B2 | 8/2007 | Srinivasan et al. | |
| 7,286,744 B2 | 10/2007 | Tada | |
| 7,369,751 B2 | 5/2008 | Son et al. | |
| 7,369,903 B2 | 5/2008 | Diederiks et al. | |
| 7,426,331 B2 | 9/2008 | Faisy | |
| 7,778,520 B1 * | 8/2010 | Virden et al. ................. | 386/278 |
| 2002/0199185 A1 * | 12/2002 | Kaminski et al. ............... | 725/25 |

(Continued)

FOREIGN PATENT DOCUMENTS

| | | | |
|---|---|---|---|
| DE | 4410546 C1 | | 9/1995 |
| WO | WO 03/043320 | * | 5/2003 |

*Primary Examiner* — David Harvey
(74) *Attorney, Agent, or Firm* — Ingrassia Fisher & Lorenz, P.C.

(57) ABSTRACT

The present invention is a set top box or other content management device that can convert television programming stored in a temporary buffer into a persistent event. The present invention may also trim data from a temporary buffer, such as an input buffer, without requiring additional software, RAM and other hardware normally associated with general purpose computers.

20 Claims, 3 Drawing Sheets

(56) References Cited

U.S. PATENT DOCUMENTS

| | | |
|---|---|---|
| 2003/0228126 A1 | 12/2003 | Buxton |
| 2004/0042103 A1 | 3/2004 | Mayer |
| 2004/0258396 A1* | 12/2004 | Nakamura et al. ............... 386/83 |
| 2005/0022242 A1* | 1/2005 | Rosetti et al. ................... 725/58 |
| 2005/0076063 A1* | 4/2005 | Andoh .......................... 707/200 |

* cited by examiner

PERSONAL VIDEO RECORDING DEVICE AND METHOD FOR SAVING A PROGRAM IN A TEMPORARY RECORDING

RELATED APPLICATIONS

This application is a continuation application of U.S. patent application Ser. No. 11/118,463, entitled "Personal Video Recording Device", filed Apr. 29, 2005, which claims the benefit of U.S. Provisional Application No. 60/566,865, entitled "Personal Video Recording Device", filed Apr. 29, 2004. Each of these applications is hereby incorporated herein by reference in its entirety.

FIELD OF THE INVENTION

The present invention generally relates to an apparatus and method for managing television programming received at a location. More particularly, the invention relates to a device that is capable of recording and managing television programming.

BACKGROUND OF THE INVENTION

The recent inclusion of data storage devices in set-top-boxes (STBs) and other devices (e.g., personal computers) permits users to record television programming for later viewing. As described in the following specification, data storage devices are typically high-capacity hard drives similar to those used in personal computers. Recording television programming for later viewing is often referred to as "time shifting." In addition, time shifting typically requires the implementation of various personal video recorder (PVR) or digital video recorder (DVR) functionality, such as pause, rewind/replay, fast forward, slow motion, skip-ahead, skip-back and other "trick-modes," into an STB unit.

Current devices that implement DVR functionality (DVR devices or DVRs) using a data storage device typically record television programming in one of two ways. Stored television programming can be referred to as a "persistent recording" if the user intends the recording to stay on the data storage device after actions such as channel changes and power off. Alternatively, a recording can be referred to as a "temporary recording" if it is not intended to be persistent. For example, if a user decides to record a movie for repeated viewing, a persistent recording may be made. However, if the user initiates the pause function during a sporting event to get refreshments, a temporary recording may be made. Upon return from getting refreshments, the user may pick up viewing from where he left off by playing back the temporary recording. Such a recording is regarded as temporary because the DVR device may eventually discard that recording of television programming (e.g., upon the occurrence of some "trigger event" such as a channel change command or power off command).

As described by the embodiments in this disclosure relating to satellite STBs, both types of recordings maybe made and stored on a hard drive. The temporary recording capacity of an STB may be fixed in size (e.g., it can store only the last hour of television programming), or the capacity may vary as the amount of space on the hard drive used to store permanent recordings varies. The recordings typically exist on the hard drive in the form of digital data files and their storage and retrieval are managed by the hard drive's file management system. For clarity, a data file on the hard drive containing some or all of a temporary recording shall be referred to as the temporary buffer or, simply, a buffer. Files containing persistent recordings shall also be referred to as persistent events.

The distinction between temporary and persistent recordings is important when one considers how a DVR's file management system often treats the two types of recordings. In many DVRs, the file management system will delete some or all of the temporary buffers, as space is needed on the hard drive, to record new persistent recordings or maintain the current temporary recording. At the same time, the file manager may also protect persistent events on the hard drive. If the distinction between temporary and persistent recordings is not made, at some point the hard drive may fill up with data and no more recording may be done until something is deleted.

Typically, there are several methods to create a persistent recording. In one method (the "manual method"), a user manually selects a channel of television programming and commands the DVR to start recording the television programming that is being delivered. Normally, the user must also either manually terminate the recording when desired programming has been completely delivered. In a second method (the "scheduling method") a user manually inputs the channel, date, time and duration of the desired television programming. The DVR then automatically records whatever is on the specified channel at the specified time and date.

In yet another method (the "Electronic Program Guide (EPG) method"), a user with access to an EPG, typically a database that contains a schedule of the current and upcoming television programming on the channels, may select a specific program to be recorded. The EPG data is often provided to a device, such as a satellite STB with integrated DVR functionality, on a separate channel by a programming distributor. If the selected programming is already being delivered, the DVR may begin recording immediately and record the remaining portion of the television programming as a persistent recording. If the selected program is to be delivered in the future, the DVR may create a timer from the EPG's schedule data that would initiate recording of the appropriate channel for the appropriate time. Alternatively, the DVR may store a program ID code that is contained in the EPG data for the specific program. This program ID code may then cause the DVR to identify and record the program when it is delivered. Furthermore, DVRs with access to EPGs or similar schedules may use the EPG data to generate an identifying name or other identifier for the recording that is independent of the method used to record a specific program.

Temporary recordings, on the other hand, are typically created in one of two ways, depending on the design of the DVR. In on-demand buffering, temporary recordings may be created when a pause function (e.g., a user command to "pause" the television programming) or some other command. In an on-demand buffering environment, and absent any such commands, the DVR may not be recording programming as temporary recordings. As mentioned above, temporary recordings made by the on-demand buffering method are typically deleted upon some triggering event, thus freeing up disc space for the next recording.

More common, however, is the continuous buffering method. In the continuous buffering method the temporary recording is continuously updated to include the most recently delivered television programming. The continuous recording method supports the trick functions including the ability to go back and replay a portion of the program the user has been watching. It supports the pause function by setting a marker at the initiation of the pause that indicates where playback should begin upon the user's release of the pause. Temporary buffers created by continuous buffering may also be deleted from time to time upon the occurrence of some triggering event. Subsequently, a new temporary buffer is created.

The above-described DVR functions have some limitations. There are times when a user may decide, while watching a specific program, that he wishes to record the program—in its entirety—for later viewing. Typical DVRs cannot do this, even those DVRs that continuously buffer previously viewed programming and have the previously viewed television programming already stored as a temporary recording. Furthermore, there are situations where a user may pause a program, and subsequently decide to start recording the program. There is currently no way to take information from the temporary buffer and store it as a persistent recording.

This is due in part to limitations of the file systems controlling the storage and retrieval of files on the hard drive. The hard drives and associated file systems used in DVR devices are typically the same as those used in general purpose or personal computers. Such file systems are designed to store and retrieve files that are created and used by different software applications. File systems do not, typically, modify or delete data from a file because they normally have no way of knowing what any given piece of data in a file represents.

File systems, however, can truncate files by deleting data from the end of the file. This ability is included so that the file system to record at least a portion of a file if there is not enough space to record the entire file. Truncation preserves the formatting and initialization data normally associated with a modem computer file which is typically stored at the beginning of the file. Such formatting information would indicate things such as what version of software the file was created by, defaults to be used in reading the data, etc.

Prior art file systems are not capable, however, of deleting data from the front end of a file. Similarly, prior art file systems for DVR devices are not capable of converting a temporary recording into a persistent recording.

Thus, there is a need for DVR devices that can convert television programming stored in a temporary buffer into a persistent event and there is a further need to provide a file system that can trim data from a temporary buffer without requiring additional software, RAM and other hardware normally associated with general purpose computers.

SUMMARY OF THE INVENTION

The present invention is a set top box or other content management device that can convert television programming stored in a temporary buffer into a persistent event. The present invention may also trim data from a temporary buffer, such as an input buffer, without requiring additional software, RAM and other hardware normally associated with general purpose computers.

In one aspect, the present invention may be considered a method of recording selected television programming on a device comprising a data storage device, wherein the selected television programming comprises a first portion and a second portion. The method includes buffering, as a temporary recording on the data storage device, television programming comprising the first portion as it is received. The first portion is delivered to a connected TV substantially when it is received. In response to a user direction to create a persistent recording of the selected television programming, television programming is trimmed from the temporary recording other than the first portion. The temporary recording is then converted into a persistent recording on the data storage device. The method also includes recording, as it is received and in response to the user direction, the second portion of the television programming as part of the persistent recording.

In another aspect, the present invention may be thought of as a set top box (STB) adapted to receive multiple channels of television programming from a programming provider. The STB includes a channel selector, a storage device and a delivery device. The channel selector is capable of selecting a first channel from the multiple channels and delivering television programming on the first channel to the storage device and the delivery device. The storage device is capable of recording television programming and delivering stored television programming to the delivery device. The delivery device is capable of receiving television programming from the channel selector or the storage device and delivering television programming to a connected TV for display thereon. The STB is further adapted to convert temporarily stored television programming on the storage device into persistently stored television programming in response to a user command to create a persistent recording comprising some or all of the television programming temporarily stored on the storage device.

In yet another aspect, the present invention may be thought of as a file system for use on a STB comprising a hard drive. The file system includes a means for distinguishing a temporary recording from a persistent recording; a means for trimming data from the beginning of temporary recordings stored on the hard drive; and a means for converting the temporary recordings into persistent recordings.

In yet another aspect, the present invention may be thought of as a television converter device for the presentation of television programming. The television converter device included an input section for receiving television programming signals and two channel selectors. The first channel selector is coupled to said input section for selecting data for a first television channel from said television programming signals. The second channel selector is coupled to said input section for selecting data for a second television channel from said television programming signals. The converter device may also include one or more processors for processing and routing said data from said television channels to an output section. The output section includes a first output port for providing a television channel to a first television set and a second output port for providing a television channel to a second television set. The converter device also includes a direct access storage device for storing data from said first television channel in a file and a trim utility for deleting data from the front of said file.

In yet another aspect, the present invention may be thought of as a television converter device for the presentation of television programming. The television converter device includes an input section for receiving television programming signals; a first channel selector coupled to said input section for selecting data for a first television channel from said television programming signals; a second channel selector coupled to said input section for selecting data for a second television channel from said television programming signals; one or more processors for processing and routing said data from said television channels to an output section; said output section having a first output port for providing a television channel to a first television set and a second output port for providing a television channel to a second television set; a direct access storage device for storing data from said first television channel in a file; and a means for deleting data from the front of said file.

DETAILED DESCRIPTION OF THE PREFERRED EMBODIMENTS

Figure 1:
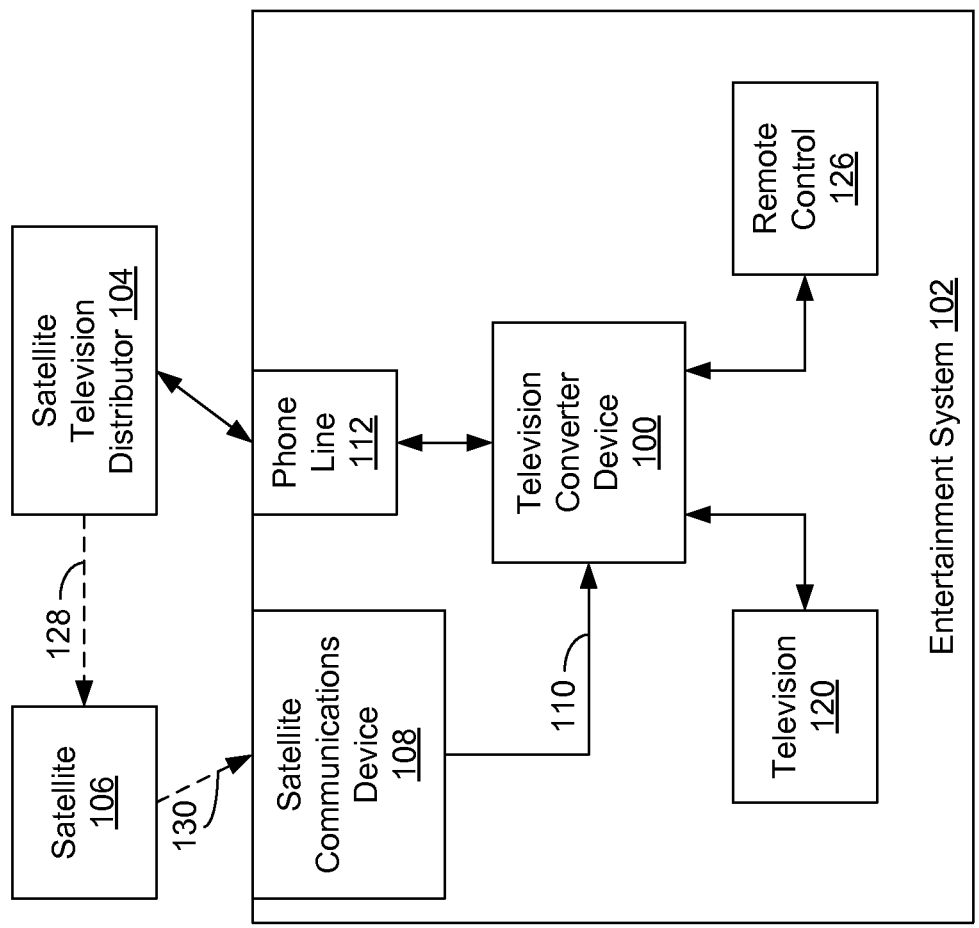
FIG. 1 illustrates an entertainment system utilizing an STB in accordance with an embodiment of the present invention.

In this specification, the present invention will be described using methods and systems related to subscriber satellite television service. This specific description is not meant to limit the invention to that one embodiment. The present invention may also be applicable to cable television systems, broadcast television systems or other television systems. The present invention is also described in terms of digital video recording (DVR) devices. The present invention may also be applicable to digital-versatile-disc (DVD) recording devices or other television recording devices. One skilled in the art will recognize that the present invention can apply elsewhere. While the invention has been particularly shown and described with reference to preferred embodiments thereof, it will be understood by those skilled in the art that various other changes in the form and details may be made therein without departing from the spirit and scope of the invention. For example, one skilled in the art will recognize that there are many different electronic means for implementing the present invention, regardless of the component, device or location of a particular embodiment. Such means include software means comprising software that can be executed at need on a processor within a component comprising the necessary hardware elements, firmware means wherein a fixed set of commands to be executed by a processor is embedded with the control circuitry of a component, hardware means wherein the present invention is expressed as fixed circuits that perform the functions when operated, or some combination of software, firmware and hardware means. From this discussion it should be clear that the present invention is directed more towards the functions and methods performed by the DVR than towards any specific means or devices for executing those functions.

As a general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "television converter," "television converter device," "receiver," "STB," "television receiving device," "television receiver," "television recording device," "satellite STB," "satellite receiver," "cable STB," "cable receiver," and "television tuner" to refer interchangeably to a converter device or electronic equipment that has the capacity to acquire, process and distribute one or more television signals transmitted by broadcast, cable, telephone or satellite distributors. "Digital video recorder" and "personal video recorder (PVR)" refer interchangeably to devices that can digitally record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, Internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite STBs.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external STB connected via cabling to a television). A further example of an external television converter device is the EchoStar Dish PVR 721, Part Number 106525, combination satellite STB and DVR. For the balance of this document, the embodiments of the present invention shall be in the form of an STB with an integrated DVR that is implemented as a stand-alone device proximate and connected to one or more TVs. One skilled in the art will recognize that the present invention may be implemented in any number of ways and need not be a stand-alone device proximate to a TV. For example, the device may be a stand-alone box designed to be located in a basement or some other central point at the user's location that allows convenient connection to various devices in other rooms at the location. The device alternatively may be implemented as part of a TV or other display device. Additionally, embodiments of the present invention may be implemented as part of a central home theater device that may include a display device and stereo sound system. A further example would be a home digital video storage library device, such as a DVD player with large capacity, a large storage device, or a portal device to a remote video library. Such a library device would utilize the present invention to allow one or more of the TVs at the user's location to independently access television programming stored on or transmitted through the library device.

As another general matter, the term "television programming" is used throughout this disclosure to simplify the discussion. One skilled in the art will recognize that the present invention is equally applicable to any signal containing content or information, whether it be video, audio, combined A/V, pictorial, textual or purely electronic in nature. Examples of programming are, but are not limited to, distinct TV programs, streaming video, streaming audio, distinct musical works, distinct pictorial or graphic works, and motion pictures or other A/V works. Programming also includes things of an interactive nature, such as telephone communication, interactive A/V games, interactive shopping and A/V communication.

Finally, as a general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel."

The term "channel," as used in this description, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite STB since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity. Thus, in satellite television service a channel may not be the same as in broadcast television service. Rather, channels may be more properly termed service providers in satellite television service. The term "channel" will be used in this description to describe the service providers and the virtual channels they may occupy.

Turning now to the Drawings, wherein like numbers denote like parts throughout the several views, FIG. 1 presents an embodiment of an entertainment system 102 that includes a television converter device 100 in the form of a satellite STB. Generally, the satellite STB 100 may receive one or more television signals from a cable television distributor, from a broadcast television distributor or from a satellite television distributor 104. As a preferred embodiment, entertainment system 102 receives signals from satellite television distributor 104. One skilled in the art will recognize that STB 100 may also receive video-digital subscriber line (VDSL), DSL, Internet, wireless and other signals from content or video distributors. The satellite STB 100 may process television signals and may send the processed signals to peripheral electronic devices, such as one or more televisions 120, for example, as set forth in FIG. 2, and remote control 126. The satellite STB 100 also may accept commands from a remote control 126 or other peripheral electronic devices. More detail about the functionality of the satellite STB 100 is provided below. One skilled in the art will recognize that many embodiments of the entertainment system 102 are possible and within the scope of this invention. Other such embodiments may include, but are not limited to, various combinations or permutations of devices and connections for the delivery, storage, and display of communications, content and other data.

To further describe the entertainment system 102, embodiments relating to receiving satellite television signals will be explained in more detail. A satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 MHz.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible.

The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the television converter device 100 via cabling. One skilled in the art will recognize that other methods and other systems of delivering the satellite signal 110 to the satellite STB 100 may be possible.

Figure 2:
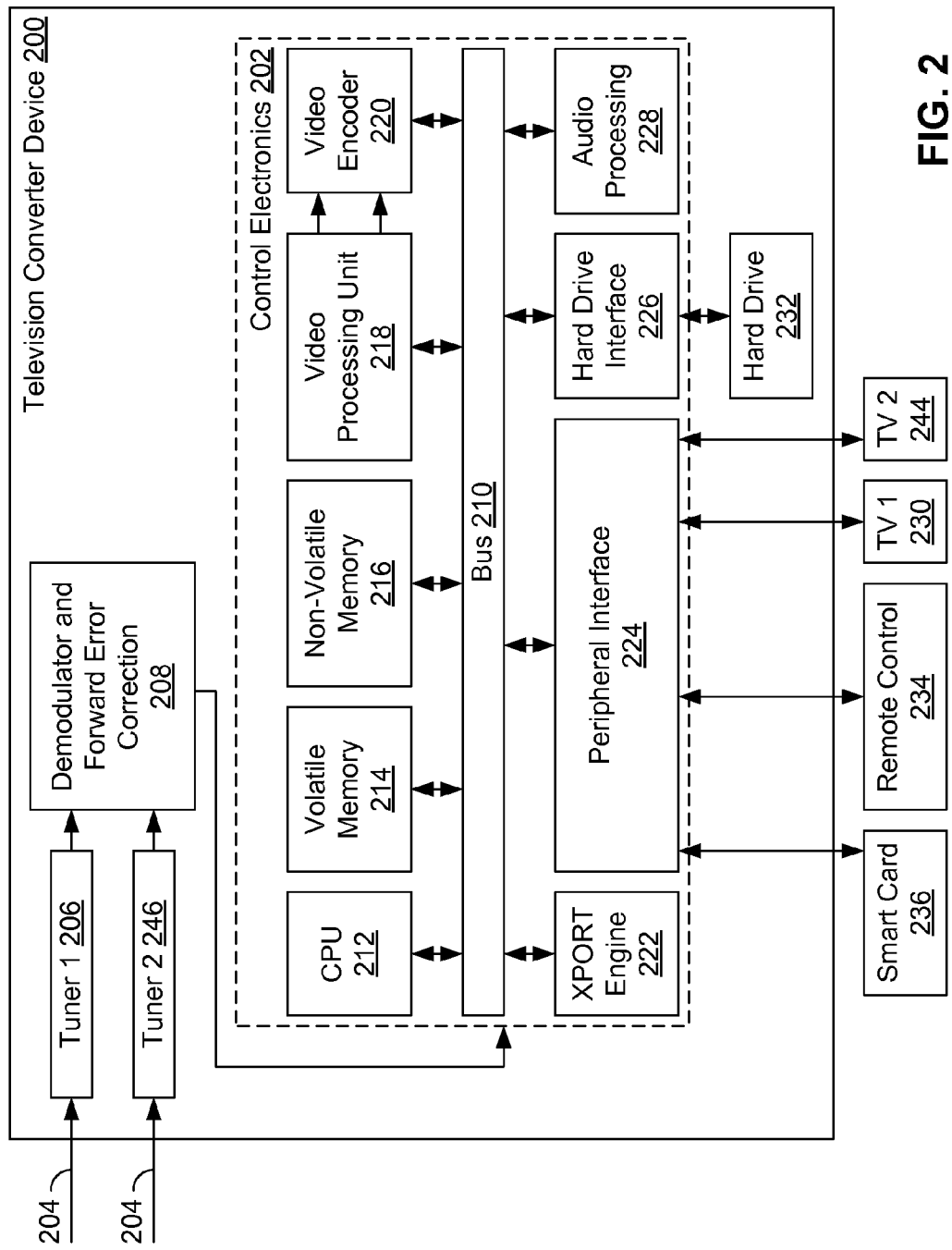
FIG. 2 is a functional block diagram of an STB in accordance with an embodiment of the present invention.

FIG. 2 provides a high-level block diagram for the satellite television converter device 100, 200 with DVR functionality in accordance with the present invention.

The signal 110, 204 that arrives at the satellite set top box 200 may undergo extensive processing. The television converter 200 may include one or more tuner devices 206, 246 that may receive a satellite signal 204. In one embodiment, tuner device 206, 246 may acquire a satellite signal or signals 204 from satellite television distributor 104. Tuner devices 206, 246 may initially process the satellite signal 204. Tuner devices 206, 246 may also receive subscriber commands in the form of signals from control electronics unit 202. Signals from control electronics unit 202 may include, but are not limited to, a signal to tune to a transponder as part of the process of selecting a certain channel for viewing on a peripheral device. One skilled in the art would recognize that the tuner device 206 may include fewer, more, or different components.

After receiving the signal 204, one of the first steps may be to demodulate 208 the signal 204. The signal 204 may arrive as an analog signal that "carries" data (e.g., data is modulated onto the analog signal). Demodulation 208 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 204 may be possible. Another one of the first steps may also be to error check 208 signal 204. One example of error checking 208 is forward error checking (FEC). FEC 208 may include, but is not limited to, inspecting parity bit or bits that may accompany signal 204. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein.

In this embodiment, satellite STB 200 contains control electronics unit 202 that receives satellite signal 204. One skilled in the art will recognize that control electronics 202 may receive other signals, including, but not limited to, signals from a cable or broadcast television distributor. One example of a control electronics unit 202 is the STMicroelectronics STi5517 Low-Cost Interactive Set-top Box Decoder, Part No. 7424736A. In a preferred embodiment, control electronics unit 202 includes discrete electronic components combined into a single circuit with a shared bus 210. In other embodiments, control electronics unit 202 may be configured differently. For example, one or more of the control electronics unit 202 components in STB 200 may be combined or omitted. The control electronics unit 202 may use a custom ASIC, such as from the LSILogic G11 family, or FPGA, such as from the Altera Stratix™ family. As a further example, one or more of the control electronics unit 202 components in STB 200 may not share a bus 210, but may nonetheless be operatively connected by some other means. One skilled in the art will recognize that other configurations of STB 200 and control electronics unit 202 are possible and within the scope of this invention. One skilled in the art will further recognize that some components of STB 200 and control electronics unit 202 may be implemented in hardware or software. The control electronics unit 202 may operate under the control of a software program, firmware program, or some other program stored in memory or control logic. One skilled in the art will also recognize that the control electronics unit 202 may include other electronic components or structures to mediate or process signals.

Control electronics unit 202 may contain one or more central-processing-units (CPUs) 212 or processors. A preferred embodiment of control electronics unit 202 contains a single CPU 212 that is operatively connected to the shared bus. In one embodiment, CPU 212 may be used, among other things, for logical operations for STB 200 functions including, but not limited to, channel selection, recording control, EPG display and control, and system maintenance. Examples of commercially available CPUs 212 include the STMicroelectronics Enhanced ST20 32-bit VL-RISC, Motorola 68000 or Intel Pentium processors. One skilled in the art will recognize that the CPU 212 may be integrated with memory or other discrete electronics components.

Control electronics unit 202 may contain one or more volatile memory components 214. Volatile memory components 214 may include, but are not limited to, one or more SDRAM memory chips. Similarly, control electronics unit 202 may also contain one or more non-volatile memory components 216. Non-volatile memory 216 may include one or more memory chips, including, but not limited to, ROM, SRAM, SDRAM and Flash ROM. One skilled in the art will recognize that volatile memory 214 and non-volatile memory 216 may be integrated within other electronics components. One skilled in the art will also recognize that other memory components may be included within STB 200 and control electronics unit 202. One skilled in the art will recognize that memory 214, 216 may be used for many purposes, including, but not limited to, storing EPG data and storing data for use by CPU 212.

In a preferred embodiment, signal 204 is in digital form (e.g., a digital stream) after demodulation and error correction. For example, digital stream 204 may use, but is not limited to using, the digital video broadcasting (DVB) transport standard. The digital stream 204 may be multiplexed and therefore require demultiplexing by XPORT Engine 222. Demultiplexing 222, or demuxing, may include separating the bits of data into separate digital data streams. The digital streams may be packetized. Thus, the multiplexing of the separate digital data streams may not be bit-by-bit but packet-by-packet. The packet size may vary or may be constant. After demuxing 222 the packets, the separate digital data streams may be reassembled by placing related packets together in a continuous data stream 204.

Each of the separate digital data streams may also be encoded. Encoding is a method for representing data. Encoding may allow the data to be compressed. Compression can provide the system with increased bandwidth. One skilled in the art will recognize that several different encoding formats are possible. In satellite television, encoding formats may include the MPEG, MPEG2 or MPEG4 standards. Beyond the raw data, the separate digital data streams may include forward error correction, headers, checksums, or other information. All of this different information may be included in the digital television signal 204 processed by the satellite STB 100. Control electronics unit 202 may therefore include one or more video processing units 218 that, among other video processing operations, may decode encoded signal 204. In a preferred embodiment, video processing unit 218 may include, but is not limited to, a graphics processor, MPEG-2 decoder and a display compositor with separate on-screen display (OSD) control for peripheral devices. One skilled in the art will recognize that video processing unit 218 may also include other electronics, including, but not limited to, alpha blending, anti aliasing, anti-flutter and anti-flicker filters, memory and video rendering components.

Another discrete electronic component of control electronics unit 202 may be a video encoder unit 220. Video encoder unit 220 may work in combination with or independently from video processing unit 218. Video encoding unit 220 may encode digital stream 204 for output to one or more peripheral devices, including, but not limited to, a television. For example, video encoding unit 220 may encode digital stream 204 for RGB, CVBS, Y/C and YUV outputs. Encoding may allow program data to be compressed. As a preferred embodiment, video encoder 220 may translate digital stream into a signal using the NTSC, PAL or SECAM standards. One skilled in the art will recognize that video encoder unit 220 may include other functionality, may be integrated into other electronic components of satellite STB 200, and may encode digital stream 204 using other standards, including, but not limited to, MPEG and MPEG2.

Control electronics unit 202 may also include one or more storage interfaces or hard drive interfaces 226 and storage devices or hard drives 232. In a preferred embodiment, television converter device 200 contains one hard drive interface 226 and hard drives 232. Hard drive 232 may be used for many purposes, including, but not limited to, storing recorded programs, buffering currently-playing programs (e.g., buffering a program may allow a user to pause or rewind a program), storing EPG data, storing commands or functions for the control electronics unit 202, storing timers or record events, and storing data for other devices within or connected to the satellite STB 200. In the embodiment of FIG. 2, the connection to the storage device 232 is shown to illustrate the capability of the STB 200 to store television programming as temporary and persistent recordings. In the embodiment the storage device 232 provides the long-term storage functionality of the STB (i.e., records and stores persistent recordings and may also include operating system software and other data or software necessary to the STB 200) and the short-term storage functionality (i.e. records and stores temporary recordings). The storage device 232 may include, for example, one or more devices, such as hard drives, as well as supporting hardware and software. In the embodiment of FIG. 2, all temporary and persistent recordings are located on the storage device 232. In the embodiment shown, the hard drive 232 comprises an 80 GB 'winchester' hard drive connected to the control electronics via a standard IDE/EIDE interface cable. As another example, hard drive 232 may be used to temporarily store data for processing by CPU 212. In this example, the hard drive 232 may allow the processor 212 to separate EPG data arriving as part of digital stream 204. One skilled in the art will recognize that other storage devices and interfaces may be substituted for hard drive interface 226 and hard drive 232 and are within the scope of this invention. One skilled in the art will also recognize that hard drive interface 226 and hard drive 232 may separately or together include an integrated memory (e.g., a memory buffer, commonly known referred to as cache) and additional processing components or logic. One skilled in the art will also recognize that hard drive interface 226 may be integrated into peripheral interface 224 (described below). Finally, one skilled in the art will recognize that hard drive 232 may be external and connected to satellite STB 200. For example, an external hard drive 232 may be connected to satellite STB 200 using USB 2.0 or IEEE 1394 (Fire Wire) connections. Such an external hard drive may include a screen for portable viewing of programming stored on it. Furthermore, in embodiments of the present invention, the storage device 232 contains expansion slots, such as IDE connections, for the provision of additional storage devices to provide additional capacity at a later time. In addition, some embodiments include connections for external storage devices such as DVD-Rs that provide the capability of using the external devices as if they were an internal storage device. The design and operation of hard drives and similar devices are well known in the art and need not be described further here.

An audio processing unit 228 may also be part of the control electronics unit 202. Audio processing unit 228 may decode the digital stream 204 for output to peripheral devices, including, but not limited to, a stereo, television speakers or portable audio or video players. For example, audio processing unit 228 may decode MPEG-1 layers I/II and layer III, Dolby Digital, Dolby ProLogic, SRS/TruSurround encoded audio in digital stream 204. Audio processing unit 228 may include one or more processors, memory components or digital-to-analog converter (DAC) systems. One skilled in the art will recognize that other audio processing components and functionality may be accomplished using audio processing unit 228.

A satellite STB 200 may be connected to one or more peripheral electronic devices through peripheral interface 224. These peripheral devices may include a stereo, television 230, smart card 236, VCR, or other devices. In one embodiment, entertainment system 102 contains, but is not limited to, two or more televisions 230, 244. Televisions 230, 244 may serve many purposes, including, but not limited to, displaying television programming, displaying one or more signals processed by one or more tuner devices 206, 246, displaying the EPG, displaying timer conflicts, and displaying other types of data, graphics and programming. Peripheral devices may receive and/or send signals from the satellite STB 200. For instance, the televisions 230, 244 may receive video and audio signals and a stereo may receive only audio signals. A camcorder, on the other hand, may send video or audio signals to the satellite STB 100 or receive audio and video signals from the STB to record. As another example, peripheral interface 224 may include a processor or other electronic components to permit an interface to content security devices such as an external "smart card." In this example, peripheral interface 224 may then encrypt or decrypt content for output to other peripheral devices. Thus, peripheral interface 224 may perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices may include many types of commercially available electronic devices.

The entertainment system 102 may also include a remote control 126, 234 peripheral device, also sometimes referred to as a remote. The remote control 234 may be used to send commands to the satellite STB 200. The remote control 234 may send commands via a wireless connection using, for example, infrared or UHF transmitters within the remote control 234. One example of an embodiment of a remote controller 234 is the EchoStar Technologies Corporation 721 Platinum Plus Remote, Part Number 121150, that includes an IR transmitter and an ultra high frequency (UHF) transmitter. The remote control 234 may be able to send signals to other peripheral electronic devices that form part of the entertainment system 102, including, but not limited to, a television, stereo, VCR, or DVD player. The STB 200 may also be able to send signals to the remote control 234, including, but not limited to, signals to configure the remote control 234 to operate other peripheral devices in entertainment system 102. In some embodiments, the remote control 234 has a set of Light Emitting Diodes (LEDs). Some remote controls may include Liquid Crystal Displays (LCDs) or other screens. The remote control may include buttons, dials, or other man-machine interfaces. While the remote control 234 may often be the common means for a subscriber to communicate with the satellite STB 200, one skilled in the art will recognize that other means of communicating with the STB 200 are available, including, but not limited to attached keyboards, front panel buttons or touch screens.

The satellite STB 200 may also include a remote control interface. A remote control interface may include any means for the user to communicate to the satellite STB 200, and may be implemented using the peripheral interface 224 of control electronics unit 202 or by connecting a peripheral remote control interface device. In a preferred embodiment, a remote control interface may receive commands from one or more remote controls 234. Remote control 234 may use infrared, UHF, or other communications technology. The remote control interface may therefore translate an input from the user into a format understandable by the control electronics unit 202. The translation systems may include, but are not limited to, electronic receivers and electronic relays. One skilled in the art will recognize that other means to receive and translate user inputs are possible.

Another peripheral device and connection to the satellite STB 200 may include a phone line and modem. STB 200 may use a modem and phone line to communicate with one or more outside entities or systems (e.g., satellite television distributor 104). The phone line may carry local or long-distance telephone service. One skilled in the art will recognize that the phone line may also carry other services, including, but not limited to, DSL service. These communications may include requesting pay-per-view programming, reporting of purchases (for example, pay-per-view purchases), obtaining updates to subscriber programming (e.g., updating EPG data), or receiving updates to software on the satellite STB 100. For example, the phone line may communicate with the satellite STB 100 using an RJ-11 style telephone connection. One skilled in the art will recognize that there are many other uses for this phone line connection. For example, EPG data may be transmitted to STB 200 via phone line or in the satellite signal 204. One skilled in the art will recognize that the EPG data may be transmitted to STB 200 by various other methods, systems and outside entities. Also, one skilled in the art will recognize that a phone line connection to satellite distributor 104 may represent other communication connections, including, but not limited to, wireless, Internet, or microwave communications connections. Another function of the phone line may be to periodically receive the EPG data. One skilled in the art will also recognize that a phone line connection may permit networked communications with other network-ready devices using the telephone wiring within a subscriber's location.

A satellite STB 200 may also include network connectivity. For example, peripheral interface 224 may include components or interfaces that permit the connection of RJ-45 cabling and transmission of TCP/IP traffic to other connected devices. As another example, a wireless router may be attached via peripheral interface 224 to allow wireless local-area-network (WLAN) data communications using a standard wireless networking protocol such as WiMAX, 802.11b or 802.11g. One skilled in the art will recognize that various other network connections to the STB 200 are possible.

In a preferred embodiment, the STB 200 selects and delivers a channel of television programming from the digital stream 204 of channels as directed by the user. In a preferred embodiment, the STB 200 also continuously buffers the delivered television programming. Continuous buffering may begin upon the occurrence of a triggering event, such as a command to the STB 200 to select and deliver a new channel of programming (i.e. a channel change command) or a power on command. When a triggering event occurs, the hard drive may delete any existing temporary buffer and may (or may not until some later triggering event) create a new one to begin receiving the subsequently delivered television programming. In an alternative embodiment, the buffer is not deleted, but may remain and record the new the television programming as it is delivered.

As programming is delivered in a preferred embodiment, the temporary buffer is populated with the data comprising the television programming. In the embodiment, the data is stored digitally as an MPEG-2 data stream. As mentioned above, the temporary buffer may have a finite size, either fixed (such as a 1-hour buffer) or otherwise limited by available space on the hard drive. Whatever its size, when the temporary buffer is full the oldest data is typically discarded as new data is received. This process may continue until a second triggering event occurs causing the buffer to be deleted altogether.

The present invention is capable, in response to user commands, of delivering television programming to a connected TV or other display device from the temporary buffer. The user may use pause, rewind and forward commands to select a point in the buffer and begin playback with a play command. Embodiments may also support slow motion and fast motion playback from the buffer as well. During these operations, the buffer may also continue to record live television programming as it is being received by the STB.

The present invention differs from typical DVR devices by allowing a user to convert selected television programming stored in the temporary buffer into one or more persistent events. In conjunction with this conversion, the user may also have the STB 200 record the balance of the television programming as it is delivered by the STB 200. Thus, the present invention allows a user to make a complete recording of a program, such as a football game, newscast or movie, that has already started, provided that the start of the program is still stored on the temporary buffer. In a preferred embodiment, the portion of the program that is stored on the temporary buffer is converted to a persistent event and the remaining portion yet to be transmitted is recorded as part of the same file as it is received by the STB 202. The persistent event may then be played back in its entirety at a later date with no loss of television programming or indication that it was created in this fashion. For the remainder of this disclosure, the persistent recording of a program created by converting a portion of television programming the temporary buffer to a persistent event and a second portion recorded as it is received shall be referred to as a Unified Recording.

In order to create a Unified Recording (as described above), the user must somehow indicate the television programming that is to be recorded as a persistent event. Embodiments of the present invention may use one or more of several different methods for the user to identify the television programming to be so converted. One method of such user identification, referred to as the manual method, requires the user to locate the point on the buffer at which the Unified Recording should start, for example by using DVR functions such as pause, rewind and fast forward. The user then indicates when the STB should stop recording the delivered television programming. Note that the present invention may also allow the user to use the DVR functions to indicate a point on the buffer that he wishes the persistent recording to end. This allows a user to convert a program or a selected portion of television programming contained entirely on the temporary buffer to a persistent event. A persistent event created this way is referred to as a Converted Recording to distinguish it from a Unified Recording.

In another method of user identification, referred to as the EPG method, the user may select a program from an EPG after the program has begun to be delivered. To use the EPG method, the user may access the EPG while the specific program is being delivered and select the specific program to be recorded as a Unified Recording. In response, the previously delivered portion of the specific program that is on the buffer, if any, would be converted into a persistent event and the remaining portion would be recorded as it is received, thus creating a Unified Recording from an EPG selection. The control electronics may use the scheduling information in the EPG to identify the start and end point when creating the persistent recording so that the user does not have to enter this information.

In another method of user identification, an even simpler method is to provide a dedicated button on a remote control to automatically record whatever program is currently being delivered as a Unified Recording. This obviates the need for the user to access the EPG and may not interrupt the delivery of the program. This method may also access the EPG schedule information when identifying the television programming to be recorded.

Another method of user identification is referred to as the program ID method. Some content providers, especially those providing content digitally, may use a unique program ID means, which may be a number or other identifier, to identify specific programs within the channels of delivered television programming. Such program ID's may be contained within the vertical blanking interval in the data area of the television programming. Using the program ID method, the user may select the specific program to be recorded by entering the program's program ID or selecting the program from a menu such as an EPG. All television programming then on the buffer with the selected program ID is then converted to a persistent event. Any subsequently received programming also containing that program ID may then recorded into the same file until the program ends (as determined by a change in the program ID of the television programming on the selected channel).

Although it sounds similar, the program ID method differs from the EPG method. The EPG method is dependent upon the accuracy of the data in the EPG database and the STB's clock to ensure that the all of the specific program is identified. For example, if the user specified program started a few minutes earlier than indicated on the EPG, either through an error in the EPG or an error in the clock, then even though the buffer may contain all of the specific program delivered so far, the STB will only copy that portion of the buffer identified by the EPG and the Unified Recording may not contain the entire program. Assuming the correct Program ID is selected, the Program ID Method helps to ensure as complete a recording of the specified program as possible because the data comprising the specified program can be positively identified.

One skilled in the art will immediately realize that the embodiment shown in FIG. 2 is but one way to provide the functionalities of the present invention described above and many alternative embodiments are possible without departing from the scope of this disclosure. For example, in an alternative embodiment, due to the form in which the television programming is stored, the storage device 232 may not directly deliver stored television programming to the peripheral interface 224 and one or more televisions 230, 244. In this alternative embodiment, the storage device 232 may first deliver the television programming to the control electronics 202, which may subsequently deliver it to other components, including, but not limited to, the video processing unit 218. In another embodiment, the storage device 232 may be capable of delivering television programming directly to the one or more TVs 230, 244.

As yet another example of an embodiment consistent with the scope of this disclosure, an STB 200 may be comprised of one or more tuners 206, 246 that are capable of processing one or more sources of television programming. For example, in a two-tuner embodiment, a user may identify a program from television programming processed by one tuner 206 to make a persistent recording and the user may also use another tuner 246 to make another persistent recording for the same or a different program. For example, a user may identify one program that is being processed by a first tuner 206 and displayed on a first television 230 in order to make a first persistent recording. The user may then switch to another source of television programming, for example, that is being processed by a second tuner 246. In this example, the television programming processed by the second tuner 246 may be displayed, for example, on second television 244 or, as another example, as a picture-in-picture (PIP) display on the first television 230. In this embodiment, the user may similarly identify a program that is being processed by second tuner 246 in order to make a second persistent recording. One skilled in the art will recognize that many ways of making persistent recordings are possible where STBs contain two or more tuners. Examples of systems using multiple tuners or channel selectors can be found in commonly assigned, co-pending U.S. patent application Ser. No. 11/118,220, entitled DEVICE COMPRISING MULTIPLE CHANNEL SELECTORS, filed Apr. 28, 2005, and which is hereby incorporated herein by reference. The DEVICE COMPRISING MULTIPLE CHANNEL SELECTORS application claims priority to U.S. Provisional Patent Application Ser. No. 60/566,300, with the same title and filed on Apr. 28, 2004, said Provisional Application Ser. No. 60/566,300 also hereby incorporated herein by reference.

Figure 3:
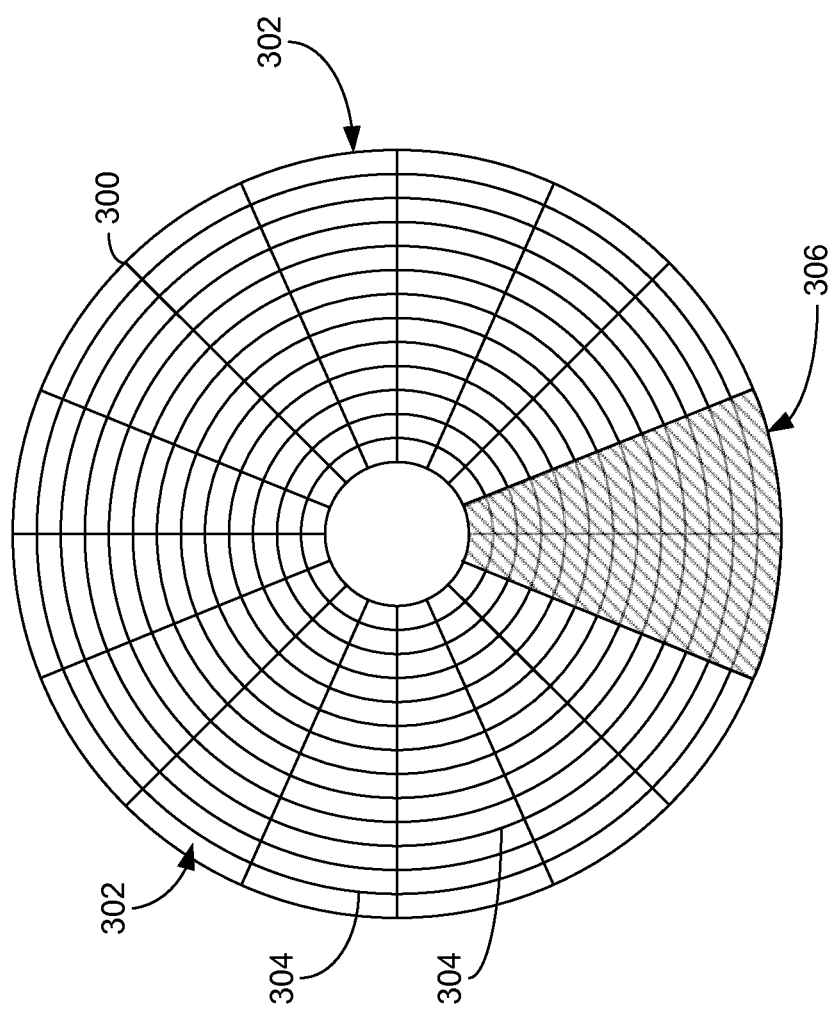
FIG. 3 shows an embodiment of a buffer sufficiently large to store one hour of television programming.

Another aspect of the present invention pertains to the file system that allows the temporary buffer to be converted into a persistent event. The file system is the general name given to the logical structures and software routines used to control access to the data on a hard drive. Hard drives typically comprise one or more platters surface coated with magnetic material upon which data (as ones and zeros) may be stored and an armature equipped with a read/write head for reading data from and writing data to the platter surface. FIG. 3 illustrates the surface of a platter used in a hard drive for storing data. Data is stored on the surface of a platter 300 in sectors 302 and tracks 304. Tracks 304 are concentric circles, and sectors 302 are pie-shaped wedges on a track. A sector 302 contains a fixed number of bytes—for example, 256 or 512. Either at the drive or the file system level, sectors 302 are often grouped together into clusters 306 (illustrated on FIG. 3 as the shaded sectors).

File systems are well known in the art. Generally, a file system is a system for naming and keeping track of data files for recording, storage and retrieval. Although they may be implemented as a separate software application, they may also be implemented as a part of the operating system of the device. File systems may maintain a file allocation table (FAT) on a hard drive. A FAT is a table that provides a map of the sectors 302 and clusters 306 that a file has been stored in. When writing a new file to a hard drive, the file may be stored in one or more clusters 306 that are not necessarily next to each other; they may be rather widely scattered over the platter surface 300. A typical cluster size is 2,048 bytes, 4,096 bytes, or 8,192 bytes. The file system creates a FAT entry for the new file that records where each cluster 306 is located and their sequential order. To retrieve a stored file, the file system consults the FAT table and retrieves the data, cluster by cluster, in the correct sequential order.

Embodiments of the present invention comprise a novel file system that allows data to be deleted from the front of a file. Herein, this deletion from the front of a file will be referred to as "trimming" a file, which is to be contrasted with "truncating a file" that refers to deletion from the end of a file. As discussed in the Background, typical file systems can truncate files by deleting the last data in the file. Such truncating is usually performed by changing the entry in the FAT table by eliminating the last cluster or clusters from the FAT table entry for a particular file. Thus, truncation will preserve formatting data contained at the beginning of files as necessary in computers where the data could be associated with any type of application or format.

The file system of the present invention takes advantage of the fact that television programming is recorded and stored on the hard drive in the temporary buffer as a continuous stream of digital television programming data. Formatting information, such as that intended to be protected by the truncation feature, is not contained in the buffered data as such information is presumed by the file system and control electronics. Since buffers do not contain formatting information, trimming data from the front of a buffer will not make the file unreadable by the STB.

Certain embodiments may use a file system that may trim data from the front of the temporary buffer by changing the FAT table entry for the temporary buffer to no longer include the earliest data. Embodiments may use the trimming function when converting a temporary buffer into a persistent event to create a Unified Recording. Using one of the methods described above, the user would identify a point in the temporary buffer where the persistent event should begin. The file system would identify which clusters in the temporary file include and sequentially follow that point and which clusters chronologically precede that point. The clusters that precede that point are trimmed from the buffer by changing the FAT entry for the temporary buffer. The remaining buffer, now starting at the identified point, is then converted into a persistent event. In some embodiments this is also achieved by changing the FAT entry for the file containing the temporary buffer to indicate that the file is now a persistent event. Note that creation of a Unified Recording in this way effectively deletes the temporary buffer.

Creation of a Unified Recording by the above-described method may be considered a triggering event in that the temporary buffer no longer exists. A new temporary buffer may or may not be created at the time of the conversion of the existing buffer. For example, in embodiments continuous buffering may not resume until the Unified Recording is completed. In alternative embodiments that support recording more than one channel of television programming to the hard drive at a time, a temporary buffer may be created immediately upon the conversion of the existing buffer.

Embodiments may also use the trimming function when creating a Converted Recording from the temporary buffer. In this case, the file system will trim the preceding data and truncate the data after the end point of the buffer (i.e. the posterior data) as indicated by the user by making the appropriate changes in the FAT entry of the file containing the temporary buffer. Again, in embodiments the FAT entry is also changed to turn the buffer into a persistent event.

Creation of a Converted Recording by the above-described method may be considered a triggering event if it results in the deletion of the existing temporary buffer. In alternative embodiments, for example, the posterior data is retained as the temporary buffer.

It will be clear that the present invention is well adapted to attain the ends and advantages mentioned as well as those inherent therein. While a presently preferred embodiment in the form of a satellite STB has been described for purposes of this disclosure, various changes and modifications may be made which are well within the scope of the present invention. For example, the embodiments described could be easily applied to television receiving devices having more than three tuners and attached to multiple televisions throughout the subscriber's location. Indeed, many other modifications and features will be readily apparent to one skilled in the art. For example, as part of the recording process, during or after, the user may be able to input textual descriptions of the persistent recordings, which would serve the same purpose as file names in a computer's file management system, to aid in the user's management of the persistent recordings. Other readily apparent features suggested by the disclosure include means for deleting persistent recordings from the STB and means for copying persistent or temporary recordings to external data storage devices. Numerous other changes may be made which will readily suggest themselves to those skilled in the art and which are encompassed in the spirit of the invention disclosed and as defined in the appended claims. Although the invention has been described in language specific to structural features and/or methodological acts, it is to be understood that the present invention defined in the appended claims is not necessarily limited to the specific features or acts described in this disclosure. Rather, the specific features and acts are disclosed as exemplary forms of implementing the claimed invention.

We claim:

1. A method of recording selected media content on a data storage device, the method comprising:
   recording, as a temporary recording on the data storage device, the selected media content, wherein the temporary recording further comprises media content that precedes the selected media content; and
   while continuing to record the selected media content:
      receiving a command to create a persistent recording of the selected media content;
      in response to the command, identifying media content in the temporary recording that is included in the selected media content;
      in response to identifying the media content that is included in the selected media content, deleting from the temporary recording the media content not included in the selected media content; and
      in response to deleting the media content not included in the selected media content, converting the temporary recording into a persistent recording on the data storage device before the selected media content has finished recording by substantially immediately updating a file allocation table to indicate a starting location of the persistent recording and substantially immediately adding the persistent recording to a user accessible and manageable listing of recorded programs, the user accessible and manageable listing of recorded programs being a listing of recorded programs different than a file allocation table listing.

2. The method of claim 1, further comprising:
while continuing to record the selected media content as the persistent recording, ceasing recording of the selected media content when completion of the selected media content is detected.

3. The method of claim 1, wherein:
the command comprises an indication of a starting location of the selected media content in the temporary recording; and identifying the media content included in the selected media content is based on the starting location.

4. The method of claim 1, wherein:
the command comprises a program selection from an electronic listing of programs, wherein the electronic listing comprises a starting time for the selected media content; and
identifying the media content that is included in the selected media content comprises determining the starting location of the selected media content in the temporary recording based on the starting time.

5. The method of claim 1, wherein:
the command comprises a program identifier identifying the selected media content, wherein the program identifier is present at least once in the selected media content as recorded in the temporary recording; and
identifying the media content that is included in the selected media content comprises determining the start of the selected media content in the temporary recording based on the presence of the program identifier in the selected media content.

6. The method of claim 1, wherein:
identifying the media content that is included in the selected media content comprises determining an identity of the media content currently being recorded, and identifying the start of the selected media content in the temporary recording based on the identity of the media content currently being recorded.

7. The method of claim 6, wherein:
the identity of the media content currently being recorded comprises a starting time of the selected media content indicated in an electronic listing of programs.

8. The method of claim 6, wherein:
the identity of the media content currently being recorded comprises a program identifier, wherein at least one instance of the program identifier is incorporated within the selected media content in the temporary recording.

9. The method of claim 1, wherein:
the temporary recording comprises a file on the data storage device; and
deleting from the temporary recording the media content not included in the selected media content comprises updating the file allocation table entry for the file to exclude from the file the media content not included in the selected media content.

10. The method of claim 1, wherein:
the temporary recording comprises a file on the data storage device; and
converting the temporary recording into the persistent recording comprises updating the file allocation table entry for the file to indicate that the file is a persistent recording.

11. An audio/video content system, comprising:
a content input interface configured to receive audio/video content;
a content output interface configured to transmit the audio/video content to an output device for presentation to a user;
a data storage device configured to record the audio/video content received via the content input interface as a temporary recording;
a user interface; and control circuitry configured to:
receive a user command via the user interface to create a persistent recording of a contiguous segment of the audio/video content currently being recorded as the temporary recording;
identify the contiguous segment in the temporary recording in response to the user command while the data storage device continues to record the contiguous segment; and
delete from the temporary recording the audio/video content not included in the contiguous segment and convert the temporary recording into a persistent recording on the data storage device in response to identifying the contiguous segment before the selected contiguous segment has finished recording by substantially immediately updating a file allocation table to indicate a starting location of the persistent recording and substantially immediately adding the persistent recording to a user accessible and manageable listing of recorded programs, the user accessible and manageable listing of recorded programs being a listing of recorded programs different than a file allocation table listing.

12. The audio/video content system of claim 11, comprising the output device.

13. The audio/video content system of claim 11, wherein the data storage device is located in a separate device from the control logic.

14. The audio/video content system of claim 11, wherein: the content input interface comprises at least one channel selection circuit, wherein the audio/video content is received over a user-selected one of a plurality of channels.

15. The audio/video content system of claim 11, wherein: the user interface is configured to receive a user indication of a starting location in the temporary recording; and
the control circuitry is configured to identify the contiguous segment in the temporary recording as the audio/video content located at the starting location and continuing to the end of the temporary recording.

16. The audio/video content system of claim 11, wherein: the contiguous segment comprises an audio/video program; the user interface is configured to receive a user indication of the audio/video program via an electronic listing of programs presented via the output device; and the control circuitry is configured to identify the contiguous segment in the temporary recording as the audio/video content associated with the audio/video program.

17. A method of recording audio/video content, the method comprising:
recording an audio/video content stream as a temporary recording; and
while continuing to record the audio/video content stream:
receiving a command to create a persistent recording of a selected audio/video segment in the audio/video content stream, wherein the audio/video segment is currently being recorded into the temporary recording;
in response to the command, identifying a starting position of the selected audio/video segment in the temporary recording;
in response to identifying the starting position of the selected audio/video segment, deleting from the temporary recording the audio/video content from the beginning of the temporary recording up to the starting position, and converting the temporary recording into a persistent recording before the selected audio/video content stream has finished recording by substantially immediately updating a file allocation table to indicate a starting location of the persistent recording and substantially immediately adding the persistent recording to a user accessible and manageable listing of recorded programs, the user accessible and manageable listing of recorded programs being a listing of recorded programs different than a file allocation table listing.

18. The method of claim 17, wherein:
the audio/video content stream is recorded as the temporary recording into a first data storage device until the command is received; and
the method further comprises, in response to the command, transferring the temporary recording from the first data storage device to a second data storage device while recording the remainder of the selected audio/video segment onto the second data storage device.

19. The method of claim 17, wherein: identifying the starting position of the selected audio/video segment comprises receiving the starting position from the command.

20. The method of claim 17, wherein: identifying the starting position of the selected audio/video segment comprises receiving the starting position from timing information for the audio/video segment resident in an electronic listing of programs.

* * * * *